United States Patent [19]

McDowall

[11] 4,022,951
[45] May 10, 1977

[54] BATTERY CONSTRUCTION

[75] Inventor: William Leslie McDowall, North Clayton, Australia

[73] Assignee: Dunlop Australia Limited, Melbourne, Australia

[22] Filed: Nov. 24, 1975

[21] Appl. No.: 634,699

Related U.S. Application Data

[63] Continuation-in-part of Ser. No. 399,778, Sept. 20, 1973, Pat. No. 3,941,615.

[30] Foreign Application Priority Data

Nov. 25, 1974 Australia .......................... 9738/74

[52] U.S. Cl. .............................. 429/149; 429/211; 429/234; 429/246
[51] Int. Cl.² .................................. H01M 10/04
[58] Field of Search ................... 136/26, 27, 36–38, 136/166, 135 S, 134 R; 429/149, 160–161, 178, 211, 233, 234, 246

[56] References Cited

UNITED STATES PATENTS

| 509,268 | 11/1893 | Usher | 136/37 |
|---|---|---|---|
| 2,684,989 | 7/1954 | Wilburn | 136/38 X |
| 3,083,250 | 3/1963 | Geissbauer | 136/38 |
| 3,941,615 | 3/1976 | McDowall | 136/38 |

Primary Examiner—Anthony Skapars
Attorney, Agent, or Firm—Ladas, Parry, Von Gehr, Goldsmith & Deschamps

[57] ABSTRACT

A multi-cell battery comprises a plurality of frames each divided into a number of side by side active paste support areas. The frames are assembled and secured together in a stacked formation so that the perimeter portions of the frames form the top, bottom and two opposite sides of the battery, and the divisions in the frames form cell partitions. Each frame is pasted with active material to form plates with adjacent plates in each frame being of opposite polarity and adjacent plates in each frame being of opposite polarity and adjacent plates in adjoining frames also being of opposite polarity. Electrolyte-porous separator material is provided between adjacent plates in adjoining frames.

10 Claims, 7 Drawing Figures

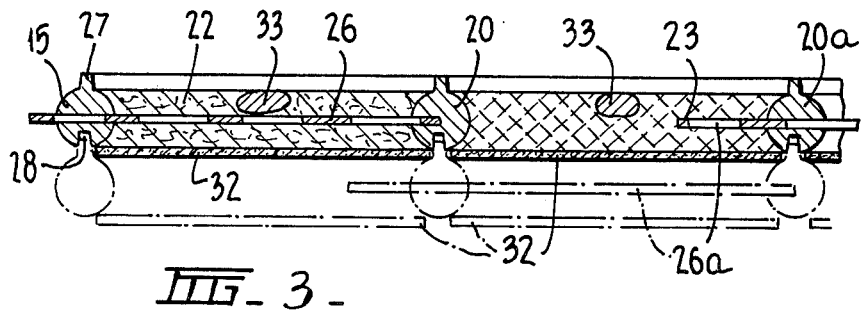
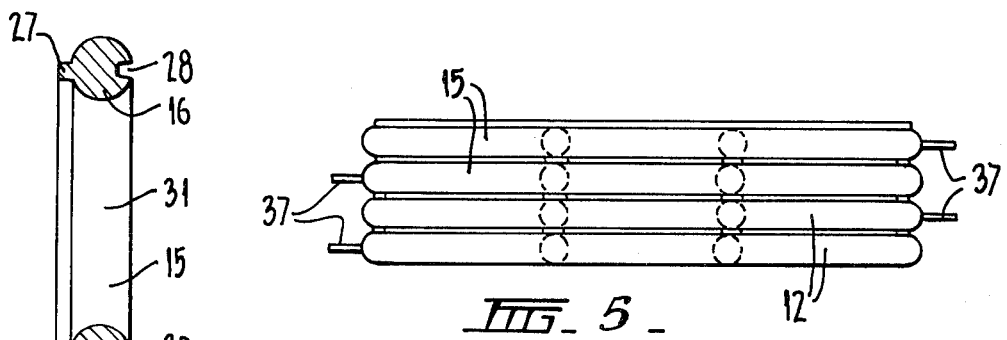
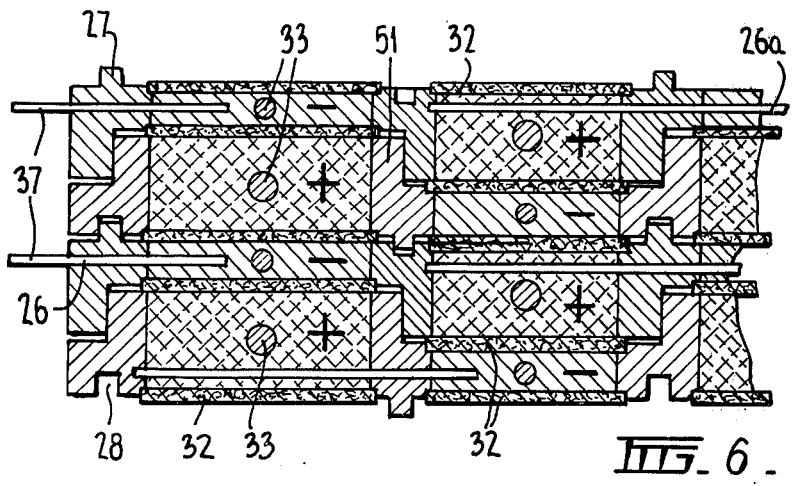
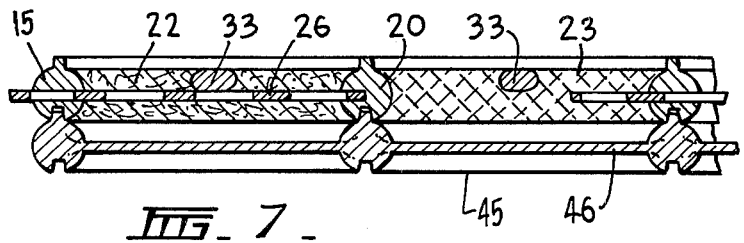

BATTERY CONSTRUCTION

This is a continuation-in-part of application Ser. No. 399,778 filed Sept. 20, 1973, now U.S. Pat. No. 3,941,615 issued Mar. 2, 1976.

This invention relates to a multi-cell secondary battery such as a lead acid battery.

One of the major disadvantages of current constructions of lead batteries is the high weight and cost of the cell plates formed of a lead alloy grid pasted with active material. Also because of the low mechanical strength of the lead alloys used in grids, the section of the alloys elements of the grid must be relatively large and hence the completed battery, is bulky in addition to heavy and costly.

The manufacture of conventional lead acid batteries and similar multi-cell secondary batteries is also costly as a result of the number of separate operaions involved, including the manufacture of the individual grids, the pasting of the individual grids, the assembly of the grids of differing polarity and separator members to form each cell, the assembly of the cells to a preformed battery case, forming the electrical connections between the cells in the case, and finally closing the case with a lid or the like. Furthermore the formation of an effective durable connection between the plates within each cell, and between assemblies of plates in adjoining cells is difficult to achieve by high volume production methods. The current trend is to make the connection between adjoining cells through an opening in the cell wall but this has produced problems in achieving a durable seal between the connecting member and the cell wall.

It is the object of the present invention to provide a battery construction which will overcome or at least reduce many of the problems of production and disadvantages in construction of presently known multi-cell batteries.

With this object in view there is provided a multi-cell battery including a plurality of frames formed of a material as herein specified, each frame defining a plurality of material support areas arranged in side by side relationship across the width of the frame, the frames being arranged in a side by side relationship in a direction normal to the width of the frame with the portions of each frame forming the divisions between adjacent support areas secured in a sealed relationship to the corresponding portions in adjacent frames to form partitions between adjacent cells of the battery.

More particularly there is provided a multi-cell battery including a plurality of frames formed of a material as herein specified, each frame defining a plurality of material support areas arranged in side by side relationship across the width of the frame, the frames being arranged in a side by side relationship in a direction normal to the width of the frame with the portions of each frame forming the divisions between adjacent support areas secured in a sealed relationship to the corresponding portions in adjacent frames to form partitions between adjacent cells of the battery, each alternate frame having an electrolyte porous separator member spanning each support area thereof and sealed to the portions of the frame defining said support area, and individual masses of active battery material supported in each support area of the remaining frame so that each said area forms a plate of the battery, the active battery material in respective areas being selected so that adjacent areas in each frame form plates of opposite polarity and adjacent areas on opposite sides of each separator member form plates of opposite polarity.

There is also provided a multi-cell battery including a plurality of frames formed of a material as herein specified, each frame defining a plurality of active material receiving areas arranged in side by side relationship across the width of the frame, the frames being arranged in a side by side relationship in a direction normal to the width of the frame with the portions of each frame forming the divisions between adjacent receiving areas secured in a sealed relationship to the corresponding portions in adjacent frames to form partitions between adjacent cells of the battery, and individual masses of active battery material support in each area of each frame so that each area forms a plate of the battery, the active battery material in respective areas being selected so that adjacent areas in each frame form plates of opposite polarity and adjacent areas in adjoining frames form plates of opposite polarity.

The frames of the battery are formed from a mouldable material which is electrically insulating at the intended operating voltage of the battery, and is inert to the active materials of the battery and any material produced during operation of the battery; herein referred to as "material as herein specified". Suitable thermoplastic materials for use in the construction of frames are high impact polystryrene, ABS, and polypropylene.

Conveniently each frame is of a rectangular form having a continuous perimeter member and a number of division portions parallel to two opposite sides of the frame to define the plurality of support areas. The perimeter member and division portions of adjacent frames are sealed together, and may also inter-fit, so that the perimeter member forms two opposition walls, a top, and a bottom of the battery and the division portions form the plurality of cell partitions of the battery. The adjacent frames may be arranged so that the frames are secured together by ultra-sonic weld which will also provide the required seal between the perimeter member and division portion of adjacent frames.

There is thus provided a plurality of side by side column-like spaces in the frame to receive active material or separator material. Each column-like space may be divided into smaller areas by a pluraltiy of transverse elements of lesser thickness than the division portions to provide additional support, which may be particularly desirable for the areas which receive active material.

The frames which support the separator material may be over-all thicker than the frames supporting active material, and as the separator material is conveniently made of thin sheet material, the thicker frames provide a greater electrolyte capacity. The frame may be moulded in situ about the separator material so that the margin of the latter is embedded in the frame.

Electrically conductive elements may be embedded in the members of the frame during formation thereof and extend into the area which receives the active material to provide electrical collectors, for the active material, and if desired, the electrical connection between areas of negative and positive active material.

If frames carrying separator material are not used, and all of the frames are pasted with active material and assembled side by side, an individual separator member of porous material is inserted between the positive and negative paste in adjoining frames.

A battery formed by an assembly of frames as previously described has a number of cells determined by the number of active material areas in each frame. The adjacent active material areas in each two adjacent frames being of opposite polarity form a basic cell having a nominal voltage of 2 volts in the case of a lead acid cell. Thus the voltage and capacity of the battery is determined by the number of active material areas in each frame and number of frames carrying active material in the assembly, respectively.

Although it is possible to electrically connect the basic cells in any desired arrangement, this construction of battery is highly suitable for connecting the basic cells formed by two adjoining frames in series, and connecting the terminals of the frames in parallel. When this arrangement of cell connections is used, suitable connector members may be located in the frame during moulding thereof to electrically interconnect the cells in the finished assembly of frames. If the basic cells formed by two frames carrying active material are to be connected in series, an intercell connector member is provided in each alternate division portion of the frame, with the intercell connector members in each frame staggered with respect to the connector members in the adjacent frame.

Also terminal elements may be located in the sides of the frames during moulding, the location and number of terminal elements being determined by the number of active material areas in the frame. If there are an even number of paste areas in each frame there is provided a terminal element at each end of each alternate frame. Where there are an odd number of paste areas in each frame there is a terminal element at alternate ends of adjacent frames. The terminal elements of individual frames are interconnected by welding to a connector strap or by other convenient means, and the battery main terminals are suitably connected thereto.

As previously indicated, the perimeter of the frames and the division portions are sealed together, with or without the provision of interfitting elements on adjacent frames so that the assembly of frames form the top, bottom, two opposite walls, and cell partitions of the battery case. The battery case is then completed by bonding cover plates to the exposed face of the two end frames of the assembly. Also suitable covers are provided if the frames have terminal elements projecting from the sides of the frames coupled by a connector strap.

Some of the advantages of the battery constructed in accordance with the present proposal are:
1. The reduction of battery weight and size by elimination of bulky lead alloy grids;
2. Elimination of forming intercell connections during assembly, with the avoidance of consequent sealing problems;
3. The possibility to eleminate a separate battery case;
4. Additional support for active material to eliminate shedding of active material;
5. Increased capacity per unit weight of battery.

The invention will be more readily understood from the following description of one practical arrangement of the invention with reference to the accompanying drawings wherein:

FIG. 3 is an enlarged cross-sectional view along line 3—3 in FIG. 2;

FIG. 4 is an enlarged sectional view along the line 4—4 in FIG. 2;

FIG. 5 is a plan view of an assembly of grids as shown in FIG. 2 and

FIG. 6 is a partial sectional view of an alternative construction of the grid.

FIG. 7 is a partial sectional view of an alternative construction to that shown in FIG. 3.

Figure 1:
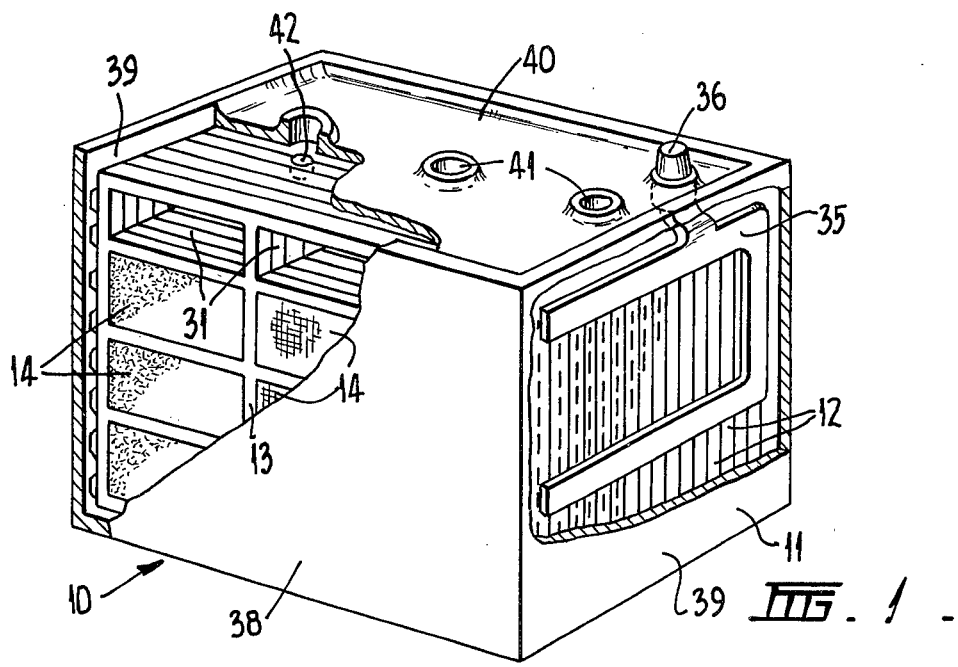
FIG. 1 is a general perspective view, partly in section, of a battery incorporating one embodiment of the present invention.

Referring now to the drawings, the battery 10 comprises a housing 11 enclosing an assembly of frame members 12 arranged and bonded together so as to form a plurality of cells 14 separated one from the other by a partition wall 13 composed of the abutting vertical elements of the respective frame members 12.

Figure 2:
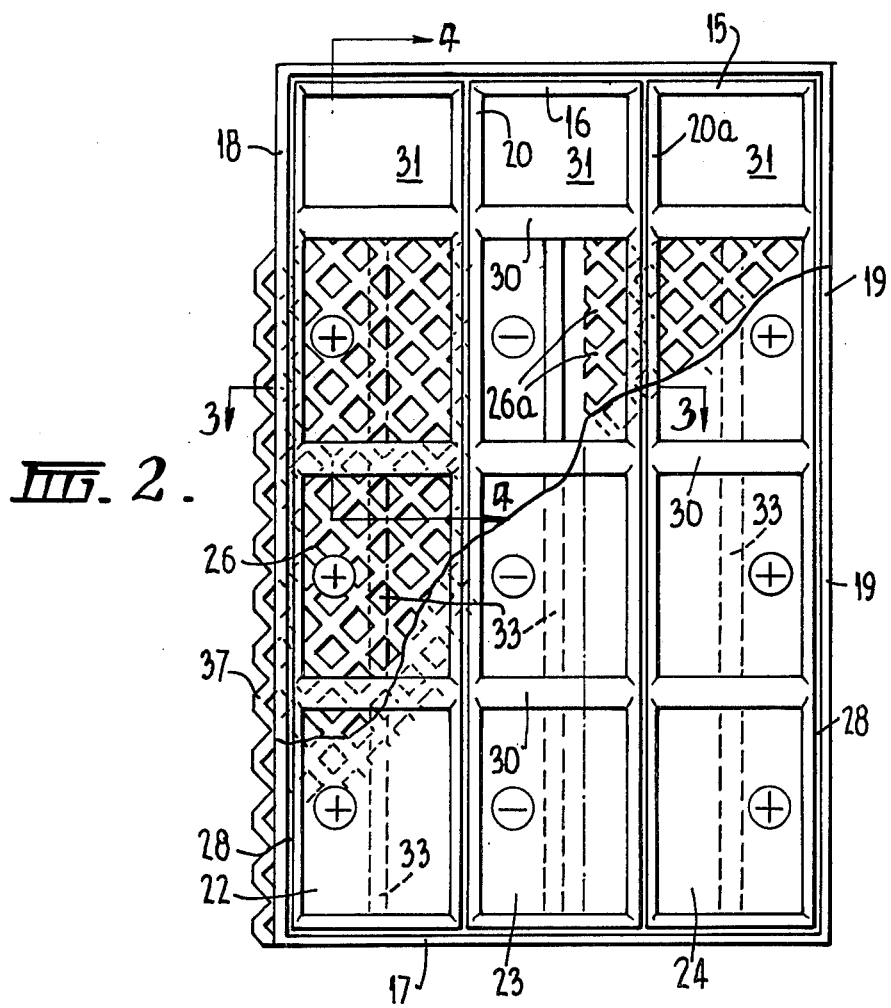
FIG. 2 is a side elevation of one grid assembly suitable for use in a battery shown in FIG. 1.

Referring now to FIG. 2, each frame member 12 comprises a perimeter member 15 having top and bottom elements 16 and 17 and opposite side elements 18 and 19. Extending between the top and bottom elements 16 and 17 are division elements 20 which are parallel to the side elements 18 and 19. The frame and the vertical division elements together define three column-like areas 22, 23 and 24 which will, in the finished battery, be pasted with appropriate active battery materaial.

The top and bottom elements and the side and division elements are provided on one face with a continuous tongue 27 at right angles to the general plane of the frame, and on the opposite face a continuous groove 28, so that when a plurality of frames are assembled in side by side relationship as shown in FIGS. 3 and 4, the tongue on one frame interfits with the groove on the adjacent frame. The interfitting tongue and groove are adhered or otherwise secured together, with or without the use of additional sealing compound, so that the connection between the top and bottom elements, the side elements and division elements in respective adjacent frames will not permit the leakage of electrolyte between the cells in the finished battery. An assembly of a plurality of frames of this construction provides an open ended box-like structure with internal partitions, the sides and top and bottom of the box being formed by the inter-fitting top and side bottom elements and the partitions being formed by the inter-fitting division elements.

The frames also include a plurality of vertically spaced support elements 30 extending between the opposite side elements 18, 19 and integral with the division elements 20. In the frame shown in FIG. 2 there are three support elements and these elements are of a thickness less than the thickness of the side and division elements so that when a number of frames are assembled in a side by side relationship, the support elements in adjacent frames are spaced one from the other. The support elements 30 divide the area between the respective division elements 20 so that the material subsequently located between the division elements is given additional support and will not become dislodged during service.

In the preferred form, grid-like structures 26, 26a are provided to span part or all of the area between the respective division elements to provide even further support for the active battery material in those areas which form active material areas in the finished battery. The grids may be formed of the same material as the remainder of the frame and moulded as an integral part thereof, but preferably is made of an electrically conductive material which is not adversely affected by the materials of the battery, such as lead alloy, and is embedded in the elements of the frame during the moulding of the frame.

In the embodiment shown in FIG. 2 the grid 26 extends through the side element 18 of the frame and is embedded in, but does not extend through the adjacent division element 20. The portion of the grid 26 external of the frame provides a terminal for electrically connecting the cells constituted by an assembly of frames. The grid 26a extends through the other division element 20a and is embedded in but does not extend through the side element 19. The grid 26a thus forms an intercell connector between plates 23 and 24. The grids 26 and 26a thus provide support for the active battery material, act as a current collector for the respective plates, and form intercell connectors and/or terminals as required in respect of cells formed by the assembly of frames.

During the pasting of the frames the area above the upper support element 30 in each frame is not pasted so that when the frames are assembled together electrolyte reservoirs 31 are formed as shown in FIG. 1. Also during assembly, separator strips 32 are inserted between the plates of active material in adjacent frames. The separators perform thier normal function in a battery, and are made of conventional material.

In an alternative construction, as illustrated in FIG. 7, a frame 45 carrying a separator member 46 in each support area is positioned between the frames described above carrying the active material. The frame 45 carrying the separator member 46 is of the same general construction as that carrying the active material, but is preferably thicker. The separator member 46, preferably made of sheet material, is sealed about the perimeter to the perimeter member 15 and to the division elements 20 of the frame. All separator members in a single frame may be formed from a single sheet of suitable material with the frame moulded in situ on to the sheet. By suitable selection of the materials of the frame and separator the sheet material is rendered non-porous where it is embedded in the division elements 20 of the frame to prevent leakage of electrolyte between adjoining cells of the finished battery via the common separator sheet. The separator may be formed of a material which will fuse under heat so that during moulding the portions of the sheet contacted by the hot frame material is fused to render it non-porous.

In order to assist the gas, generated when the battery is in use, to escape from between the plates, vent strips 33 made of porous material extend vertically through the mass of active material forming each plate. The vent strip may be added to the frame prior or during the pasting operation, or may be located in the mould during moulding of the frame so that the vent is bonded to the support elements 30.

In order to form a battery such as is shown in FIG. 1, a plurality of frames of the construction shown in FIG. 2 are individually pasted with conventional active battery material so that the adjacent areas in each frame are of opposite polarity. Thus each frame forms a plurality of side by side plates of alternate positive and negative polarity. A number of these frames are then assembled together in a side by side relationship with each plate in each frame, adjacent a plate of opposite polarity in the adjoining frame. In assembling the frames, the tongues and grooves on adjacent frames inter-fit and are sealed together. The series of cells so formed by each two adjacent frames are electrically connected in series by the grids, such as 26a, and have positive and negative terminal tags 37 at respective ends as seen in FIG. 5. The terminal tags 37 at opposite ends of the assembly of frames are then connected to respective connector straps 35 which carry the main terminals such as 36.

Although the assembly of frames will form a top, bottom and two opposite side walls, the remaining two sides include exposed active material and the two side plates 38 are secured to these two sides to complete the battery case. In some applications it is also desirable to provide cover plates 39 for the terminal tags and connector straps, and these cover plates may be secured to the side plates 38. The cover 40 is also provided with openings 41 which align with openings 42 which have been cut into the top face of the assembly of frames, to enable the introduction of electrolyte to each cell of the battery.

It will be appreciated that a suitable adaption of the construction of the frames, the cover plates and/or top cover may not be required.

Referring now to FIG. 6, there is here shown a horizontal section through an assembly of frames of a battery of the same basic construction as previously described, but wherein the individual frames are of an alternative construction. The side element 50 and division element 51 are each of step shaped cross section arranged so that in assembly the step shaped sections inter-fit. In addition the stepped shape of the element results in the frame having alternate thick and thin active material receiving areas, and as a greater mass of positive active material is required in a normal battery than negative active material, the thick area of the frame may be pasted with positive active material and the thin area with negative active material.

The arrangement of the current collectors, intercell connectors, terminal tags and separator strips is the same as previously described with reference to FIGS. 2 to 4. The frames are also provided with tongue and groove elements that inter-fit on assembly of the frames to locate and hold the frames, and provide a sealed joint between the cells in the finished battery.

Reference has been made in this specification to the use of individual frames to support the separator material between the areas of active material in adjacent frames carrying same. In order to avoid the cost of production of individual frames carrying the separator material, the frames carrying the active material may be shaped to form, when two such frames are assembled side by side, a recess to receive the marginal edges of a separator member located between the areas of active material in adjacent frames. The marginal edges of the separator member may be bonded to the portions of the frames defining the recess. This bonding may be effected in the same operation employed to secure the frames together, such as ultra-sonic welding of the frames.

I claim:

1. A multi-cell battery including a plurality of frames formed of a mouldable material which is electrically insulating at the intended operating voltage of the battery and is inert to the active materials of the battery and any material produced during operation of the battery, each frame defining a plurality of separate material receiving areas in side by side relationship across the width of the frame, each frame including portions forming divisions between adjacent support areas of the frame, the frames being arranged in a side by side relationship in a direction normal to the width of the frame with the portions of each frame forming the divisions between adjacent receiving areas secured in a sealed relationship to the corresponding portions in adjacent frames to form partitions between adjacent cells of the battery, and electrolyte porous separator member located between each two adjacent frames in the assembly of frames spanning each support area thereof and sealed to the portions of the frame defining said support area, and individual masses of active battery material support in each area of each frame so that each area forms a plate of the battery, the active battery material in respective areas being selected so that adjacent areas in each frame form plates of opposite polarity and adjacent areas in adjoining frames form plates of opposite polarity.

2. A multi-cell battery including a plurality of frames formed of a mouldable material which is electrically insulating at the intended operating voltage of the battery and is inert to the active materials of the battery and any material produced during operation of the battery, each frame defining a plurality of separate material receiving areas arranged in side by side relationship across the width of the frame, each frame including portions forming divisions between adjacent support areas of the frame, the frames being arranged in a side by side relationship in a direction normal to the width of the frame with the portions of each frame forming the divisions between adjacent receiving areas secured in a sealed relationship to the corresponding portions in adjacent frames to form partitions between adjacent cells of the battery, each alternate frame having an electrolyte porous separator member spanning each support area thereof and secured to the portions of the frame defining said support area, and individual masses of active battery material supported in each support area of the remaining frames so that each said area forms a plate of the battery, the active battery material in respective areas being selected so that adjacent areas in each frame form plates of opposite polarity and adjacent areas on opposite sides of each separator member form plates of opposite polarity.

3. A battery as claimed in claim 2 wherein electric connector members extend through alternate division portions of the frames supporting active battery material the arrangement of the connector members being such that each two adjacent frames supporting active battery material form a series connected battery having a number of cells equal to the number of division portions plus one.

4. A battery as claimed in claim 2 wherein at least some of the frames supporting active battery material include a terminal member extending from the active battery material of the plate at one side of the frame through said side of the frame, and a connector member extends through each alternate division portion of the frame counted from said one side to electrically connect the plates of opposite polarity separated by said alternate division portions.

5. A battery as claimed in claim 2 wherein the frame members are adapted to inter-fit one with the other when assembled in the side by side relation.

6. A battery as claimed in claim 2 wherein each division portion of each frame is formed with a laterally projecting tongue on one side and a groove on the opposite side, said tongue and groove extending the full length of the division portion and being arranged so that when the frames are assembled in side by side relation, the tongues on one frame engage the grooves on the adjoining frame.

7. A multi-cell battery as claimed in claim 4 wherein the terminal members on selected frames are electrically connected to battery terminals so that the assemblies of series connected cells are connected in parallel.

8. A multi-cell battery as claimed in claim 2 wherein the frame is moulded in situ on to a sheet of material forming the separator member in each support area of the frame so that during the moulding a seal is formed through the sheet material within the division portions of the frame to prevent the passage of electrolyte through the division portions.

9. A multi-cell battery comprising a plurality of frames formed of a mouldable material which is electrically insulating at the intended operating voltage of the battery and is inert to the active materials of the battery and any material produced during operation of the battery, each frame including a continuous perimeter member of rectangular shape and a number of division elements parallel to two opposite sides of the frame, said perimeter member and division elements defining a plurality of active material support areas arranged in side by side relation across the width of the frame, the frames being arranged in side by side relation in a direction normal to the width of the frames, the perimeter member and division elements of each frame inter-fitting with the corresponding portion of the adjacent frame and being secured thereto in sealed relation to form two opposite side walls, a top, a bottom and a plurality of cell partitions of the battery, each alternate frame having an electrolyte porous separator member spanning each support area thereof and secured to the portions of the frame defining said support area, and individual masses of active battery material supported in each support area of the remaining frames so that each said area forms a plate of the battery, the active battery material in respective areas being selected so that adjacent areas in each frame form plates of opposite polarity and adjacent areas on opposite sides of each separator member form plates of opposite polarity, one of said sides of each remaining frame having metallic terminal elements embedded therein and projecting externally of the frame and into the active battery material in the support area adjacent said side of the remaining frame, metallic intercell connector elements embedded in each alternative division element of each remaining frame and extending into the active battery material in the support areas on opposite sides of said division element.

10. A multi-cell battery as claimed in claim 9 wherein a portion at the upper end of each support area is free of active battery material to provide an electrolyte reservoir in each cell of the battery.

* * * * *